US012428269B2

(12) United States Patent
Uebel

(10) Patent No.: US 12,428,269 B2
(45) Date of Patent: Sep. 30, 2025

(54) ARRANGEMENT FOR ALIGNING A RAISED LOAD

(71) Applicant: Heinrich de Fries GmbH, Düsseldorf (DE)

(72) Inventor: Katharina Maria Uebel, Düsseldorf (DE)

(73) Assignee: Heinrich de Fries GmbH, Düsseldorf (DE)

( * ) Notice: Subject to any disclaimer, the term of this patent is extended or adjusted under 35 U.S.C. 154(b) by 800 days.

(21) Appl. No.: 17/752,086

(22) Filed: May 24, 2022

(65) Prior Publication Data

US 2022/0380182 A1 Dec. 1, 2022

(30) Foreign Application Priority Data

May 26, 2021 (DE) ..................... 10 2021 113 489.7

(51) Int. Cl.
*B66C 13/08* (2006.01)
*B66D 3/14* (2006.01)

(52) U.S. Cl.
CPC ................ *B66C 13/08* (2013.01); *B66D 3/14* (2013.01)

(58) Field of Classification Search
CPC ......... B66C 13/08; B66C 23/62; B66C 23/42; B66D 3/14
USPC ...................................................... 294/82.11
See application file for complete search history.

(56) References Cited

U.S. PATENT DOCUMENTS 3,597,865 A * 8/1971 Rumfelt .................... E02F 3/60 267/71
3,897,097 A * 7/1975 Davis, Jr. ................ B66C 13/08 294/81.4
4,348,011 A 9/1982 Honda
4,512,555 A 4/1985 Nakamura
5,970,636 A * 10/1999 Briscoe ..................... E02F 3/58 37/395
6,209,234 B1 * 4/2001 Meyers ..................... E02F 3/58 37/398
6,484,423 B1 * 11/2002 Murray ..................... E02F 3/58 37/396

(Continued)

FOREIGN PATENT DOCUMENTS

CN 105858435 8/2016
DE 1 964 863 7/1967
DE 91 05 100 10/1992

(Continued)

*Primary Examiner* — Paul T Chin
(74) *Attorney, Agent, or Firm* — Gudrun E. Huckett

(57) ABSTRACT

An arrangement for aligning a raised load has a rigid carrier element and tension cords secured to and extending down from the carrier element. The lower ends of the tension cords are provided for securing at load engagement points on the load. One tension cord has a length adjustment device extending between upper and lower connection points. The length adjustment device has a housing pivotably secured to the upper connection point. A drive shaft is mounted rotatably in the housing. A drive wheel, a friction disc brake, a load wheel, and a gear mechanism, coupling the drive shaft to the load wheel, are arranged on the drive shaft. The load wheel has over its circumference chain link cavities for individual chain links of a chain sling guided around the load wheel. The chain sling is secured by one of its ends at the lower connection point.

9 Claims, 1 Drawing Sheet

(56) References Cited

U.S. PATENT DOCUMENTS

2015/0314998 A1* 11/2015 Ishikawa ................. F16G 15/00
254/358

FOREIGN PATENT DOCUMENTS

GB 2 058 006 4/1981
GB 2 063 210 6/1981

* cited by examiner

ARRANGEMENT FOR ALIGNING A RAISED LOAD

BACKGROUND OF THE INVENTION

The invention relates to an arrangement for aligning a raised load; the arrangement comprises a rigid carrier element and at least two tension cords secured to and extending down from the carrier element, wherein the lower ends of the tension cords are designed for securing at respective different load engagement points on the load, wherein a constituent part of at least one tension cord is a length adjustment device extending between an upper connection point and a lower connection point.

The mounting of primarily heavy construction parts with large dimensions is often only possible using special installations, at which the construction parts are suspended. In this context, it is often additionally necessary to align the already raised construction part. An example here is bridge sections, which yet have to be introduced, i.e. inserted, into a partially erected bridge structure and which first have to be aligned precisely in general or in all directions for this purpose. This is done using an arrangement of a rigid carrier and tension cords secured to and extending down from the carrier. The lower ends of the tension cords are secured detachably at respective different load engagement points of the load to be raised, e.g. at the four corner points of a structural part with a rectangular footprint.

The individual tension cords are composed predominantly of cables or chains with correspondingly large dimensions, or of a combination of partly cables and partly chains. When chains are used, various European safety regulations require specially configured and standardized chains, e.g. referred to as chain slings or lashing chains, for intended uses of this type. For aligning the load, additional length adjustment devices, which extend between an upper connection point and a lower connection point of the relevant tension cord, are constituent parts of at least some of the tension cords. Frequently used length adjustment devices are length-adjustable threaded rods, since they are inexpensive and can be incorporated easily into the respective tension cord. However, operating these threaded rods can be difficult and, primarily in delicate alignment situations, can also be relatively time-consuming.

The invention seeks an improved technical solution for situations in which loads, primarily heavy loads with large dimensions, must be aligned quickly and at the same time delicately while they are in the raised state.

SUMMARY OF THE INVENTION

To achieve the object, an arrangement for aligning a raised load is proposed that is characterized in that the length adjustment device has a housing pivotably secured to the upper connection point and a drive shaft which is mounted rotatably in the housing and along which a drive wheel, a friction disc brake, a load wheel, and a gear mechanism, which couples the drive shaft to the load wheel, are arranged; in that the load wheel is provided over its circumference with chain link cavities for the individual chain links of a chain sling or lashing chain guided around the load wheel; and in that the chain sling or lashing chain is secured by way of one of its ends at the lower connection point.

The arrangement comprises a rigid carrier and at least two tension cords secured to and extending down from the carrier. The lower ends of the tension cords are designed for securing at respective different load engagement points on the load. A constituent part of at least one of the tension cords is a length adjustment device extending between an upper connection point and a lower connection point. The length adjustment device has a housing pivotably secured at the upper connection point and a drive shaft which is mounted rotatably in the housing and along which a drive wheel, a friction disc brake, a load wheel, and a gear mechanism, which couples the drive shaft to the load wheel, are arranged. The load wheel is provided over its circumference with chain link cavities for the individual chain links of a round link chain guided around the load wheel, this round link chain being of the special chain sling type. The chain sling is secured by way of one of its ends tautly at the lower connection point of the tension cord.

For safety reasons, the chain sling guided over the load wheel should have a minimum length between the load wheel and the location at which its lower chain end is secured at the lower connection point. This minimum length depends on the load situation and the material thickness of the chain sling and should be e.g. between 1.5 m and 3 m.

In this way, what is provided is a technical solution for situations in which loads, primarily heavy loads with large dimensions, must be aligned safely, quickly and at the same time delicately while they are in the raised state. This is important in situations involving e.g. a precise general alignment, or a precise alignment in all directions, of the load before it is fitted, with millimeter precision, into an already existing construction.

According to one configuration of the arrangement, on each of the further tension cords, at least one longitudinal section of the relevant tension cord is also formed by a chain of the chain sling type. The minimum length that these standardized chain slings must have is frequently specified by the safety regulations to be observed.

The number of tension cords may be different, depending on the load situation and in particular the geometries and dimensions of the load to be raised. Depending on the load situation, the number of tension cords is generally between two and four. In the case of especially heavy loads, however, it may also be necessary to suspend them e.g. on six individual tension cords. In all of these cases, the safety regulations to be observed can specify that, on each of the tension cords, at least one longitudinal section is formed by a chain of the chain sling type, and that furthermore a certain minimum length of the chain sling is observed.

Thus, a first possible embodiment uses a total of two tension cords secured to and extending down from the carrier, wherein the lower ends of the tension cords can be secured at load engagement points on the load that are remote from one another; in this case, it is even sufficient for the purpose of precisely aligning the load when only one of the two tension cords is provided with the length adjustment device.

Another embodiment uses a total of three tension cords secured to and extending down from the carrier, wherein the lower end of the first tension cord, on the one hand, and the lower ends of the second and the third tension cord, on the other hand, can be secured at load engagement points on the load that are remote from one another. In this case, it is sufficient when only one or only two of the three tension cords is/are provided with the length adjustment device.

A further embodiment uses a total of four tension cords secured to and extending down from the carrier, wherein the lower ends of the first and the second tension cord, on the one hand, and the lower ends of the third and the fourth tension cord, on the other hand, can be secured at load engagement points on the load that are remote from one another. In this case, it is sufficient when only either the first or the second tension cord and, at the same time, either the third or the fourth tension cord are provided with the length adjustment device.

The length adjustment device can be driven either manually or by motor, e.g. an electric motor, in order to lengthen or shorten its effective length. In terms of the manual drive preferred here, one configuration proposes a simple round link chain guided over the drive wheel for the purpose of manually operating the drive wheel.

The decisive aspect of the arrangement described here is that a hoist configured as a spur-gear block and tackle (spur gear hoist) or a lever hoist with incorporated ratchet function (ratchet hoist) is used or utilized as sling means. The tension-loaded chain is especially important here. This is not the simple tension link chain conventional in spur-gear chain hoists, but rather is of the so-called chain sling construction type. Chain slings are standardized components specified, for example, in the German industry standards DIN EN 818-1 to DIN EN 818-6.

BRIEF DESCRIPTION OF THE DRAWINGS

Further advantages and features will become apparent from the following explanation of different exemplary embodiments on the basis of the drawings.

DESCRIPTION OF PREFERRED EMBODIMENTS

Figure 1:
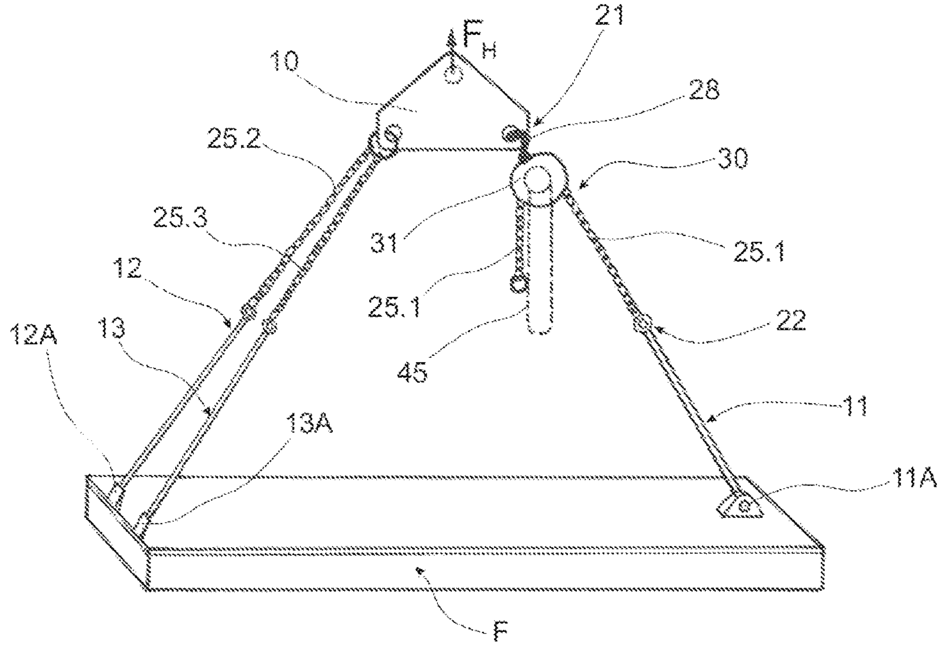
FIG. 1 shows a perspective view of an arrangement for aligning a raised load, consisting of multiple, and in this instance three, tension cords.
Figure 2:
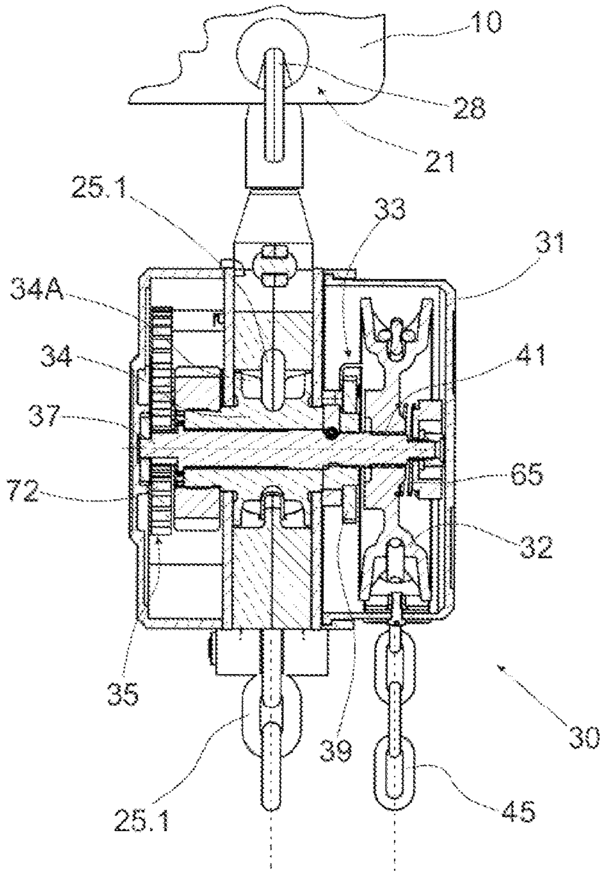
FIG. 2 shows a section through a length adjustment device used in one of the tension cords of the arrangement.

When mounting large construction parts, which often can be raised only with the aid of special installations, it is often additionally necessary to align the already raised load F, e.g. a segment of a bridge structure to be inserted. This is done using the arrangement described here of a rigid carrier element 10 and tension cords 11, 12, 13 secured to and extending down from the carrier element 10. The lower ends of the tension cords are secured detachably at load engagement points of the load F, e.g. in this instance at three corner points or at the four corner points of a load with a rectangular footprint. The individual tension cords 11, 12, 13 are composed predominantly of cables or chains with correspondingly large dimensions, or of a combination of partly cables and partly chains.

The load F, with exertion of the lifting force $F_H$, is raised, for example, using a hoisting means via the tension cords, in the exemplary embodiment three tension cords 11, 12, 13, extending obliquely downwards from the central carrier element 10. The lower ends of the tension cords are designed to be secured at respective different load engagement points 11A, 12A, 13A on the load F, e.g. by suspending them using detachable hooks. The upper ends of all the tension cords 11, 12, 13 are fitted in openings in the rigid carrier element 10, which, in turn, can be raised from above by the hoisting means.

In the case of the central arrangement preferred here of the common carrier element 10, all the tension cords 11, 12, 13 should have approximately the same length.

The raised load F is very sensitive with regard to its precise alignment, e.g. with regard to its precise levelling in relation to the horizontal. For alignment purposes, it is necessary to precisely adjust the effective length of individual tension cords in order to arrive at the desired levelling of the load F. To that end, a constituent part of at least one of the tension cords 11, 12, 13 is a length adjustment device 30 extending between an upper connection point 21, which is part of the relevant tension cord, and a lower connection point 22, which is likewise part of this tension cord.

The length adjustment device 30 is formed by a hoist configured either as a spur-gear block and tackle or a lever hoist (ratchet hoist). Such a spur-gear block and tackle is described in more detail in its basic design for example in U.S. Pat. No. 4,348,011, and such a lever hoist with incorporated ratchet function (ratchet hoist) is described in more detail in its basic design e.g. in U.S. Pat. No. 4,512,555.

A chain sling 25.1 formed of oval chain links is guided through the spur-gear block and tackle or alternatively through the lever hoist (ratchet hoist) in such a way that, by actuating the hoist, the length of that chain section of the chain that is guided out of the housing 31 of the length adjustment device 30, and therefore the overall length of the length adjustment device 30, can be delicately adjusted.

The chain sling 25.1 used in the length adjustment device 30 is of decisive importance for safety and primarily operational safety. This is not the simple tension link chain conventional in spur-gear hoists and lever hoists, but rather is of the chain sling or lashing chain type. Chain slings are standardized components and are specified in the German industry standards DIN EN 818-1 to DIN EN 818-6. Therefore, in the arrangement of FIG. 1, the length adjustment device 30 is in the form of a hoist configured as a spur-gear block and tackle (spur gear hoist) or a lever hoist with incorporated ratchet function (ratchet hoist) as sling means.

A hook 28 able to bear high loads is secured at the top of the housing 31 of the length adjustment device 30. The hook 28 may be mounted rotatably with respect to the housing 31. By means of the hook 28, the housing 31 is rigidly suspended from the upper connection point 21 of the tension cord 11 in the longitudinal direction of the tension cord.

The housing 31 accommodates the following, in an axial arrangement one behind the other and transversely to the longitudinal extent of the tension cord 11: a drive wheel 32, a friction disc brake 33, a load wheel 34, and a gear mechanism 35. The drive wheel 32 is provided at one end of a drive shaft 37 extending transversely to the tension cord 11. The drive shaft 37 is arranged centrally and passes through the friction disc brake 33 and the load wheel 34. The drive wheel 32 can be coupled via the drive shaft 37 to the gear mechanism 35, which is located at the other end of the drive shaft 37 and drives the load wheel 34. The gear mechanism 35 is e.g. in the form of a planetary gear mechanism.

The load wheel 34 is provided with chain link cavities 34A, distributed uniformly over its circumference, for the form-fitting accommodation of the individual chain links of the chain sling 25.1. In this respect, the chain sling 25.1 wraps around the load wheel 34 over a wrap angle of approx. 180°. The shape of the chain link cavities 34A is matched to the specific geometry of the oval chain links of the chain sling 25.1.

The chain sling 25.1 is provided with a ring, which forms the lower connection point 22, at its load-side end. This ring, produced by forging, also meets the specification of a sling means and is specified in more detail, for example, in the German industry standards DIN EN 1677-1 to DIN EN 1677-6.

The load-free other end of the chain sling 25.1 can either dangle freely from the housing 31, or be collected in a chain box.

The friction disc brake 33 may be designed to operate by means of frictional engagement or by means of a form fit, or by a combination of frictional engagement and form fit. The friction disc brake 33 is preferably composed of a ratchet disc 39, friction discs arranged on either side of the ratchet disc 39, and pawls. The pawls are mounted pivotably on the housing 31 and lie against locking teeth of the ratchet disc 39 under spring pressure. The two friction discs enter into a frictionally engaging connection, on the one hand, with the ratchet disc 39 and, on the other hand, with a pressure disc fixed on the drive shaft 37 or with a drive wheel 32, respectively.

The task of the friction disc brake 33 is to hold or block the tension acting in each case on the spur-gear block and tackle or alternatively on a lever hoist (ratchet hoist) when the drive wheel 32 is at a standstill. In this case, the drive wheel 32 is pressed against the pressure disc via the friction discs and the ratchet disc 39, and the pawls lie lockingly in the recesses on the circumference of the ratchet disc 39.

The drive shaft 37 is provided with a thread 41 on the end that is bearing the drive wheel 32 that is in the form of a chain wheel for a link chain 45; a mating thread on the drive wheel 32 engages the thread 41. A helical compression spring 65 subjects the drive wheel 32 to load in a direction towards the friction disc brake 33. A plate of the housing 31, together with a further plate arranged parallel thereto and spaced apart therefrom, serves to rotatably mount the load wheel 34, which is in the form of a chain wheel for the chain sling 25.1. The drive shaft 37 engages in a gearwheel 72 of the gear mechanism 35 by way of a toothed end portion. The gearwheel 72 meshes with toothed pinions in the form of constituent parts of two gearwheels of the gear mechanism.

To shorten any tension cord 11, 12, 13 having the length adjustment device 30 as constituent part, the drive wheel 32 is rotated clockwise by pulling on the link chain 45 guided over the drive wheel 32. Since the drive wheel 32 can initially rotate freely with respect to the drive shaft 37, a relative rotation of the drive wheel 32 in relation to the drive shaft 37 initially takes place but then ends, with the result that from this point onwards the drive shaft 37 rotates clockwise. There is therefore a direct transmission of torque from the drive wheel 32 to the load wheel 34 via the drive shaft 37 and the gear mechanism 35.

By virtue of a right-handed thread between the brake disc and the drive shaft 37, the brake disc of the friction disc brake 33 lifts off from the friction disc when the drive wheel 32 is rotating clockwise. The effective length of the length adjustment device 30 is thus shortened without a braking action. However, when the drive wheel 32 is brought to a standstill, the load on the load wheel 34 causes it to rotate counterclockwise, as a result of which the drive shaft 37 rotates. As a result of this, the brake disc is pulled against the friction disc. The effective length obtained of the length adjustment device 30 is thus fixed.

When, by contrast, the effective length of the length adjustment device 30 is to be increased, the drive wheel 32 is rotated counterclockwise by pulling on the link chain 45 in the opposite direction. Entrainment occurs only once a predetermined idle rotational angle has been reached, with the result that the brake disc is displaced in the axial direction of the drive shaft 37 and lifted off of the friction disc. The tension in the chain sling 25.1 that is acting on the load wheel 34 brings about a relative rotation of the drive shaft 37 in relation to the drive wheel 32, as a result of which the brake disc is pulled against the friction disc.

Pulling on the link chain 45 by hand in one direction thus increases the effective length of the length adjustment device 30 and pulling in the other direction shortens the effective length of the length adjustment device 30, in order to modify the overall length of the relevant tension cord 11 and thus the position of the load F in terms of height.

LIST OF REFERENCE CHARACTERS

10 Carrier element
11 Tension cord
11A Lower load engagement point
12 Tension cord
12A Lower load engagement point
13 Tension cord
13A Lower load engagement point
21 Upper connection point of the length adjustment device
22 Lower connection point of the length adjustment device
25.1 Chain sling or lashing chain
25.2 Chain sling or lashing chain
25.3 Chain sling or lashing chain
28 Hook
30 Length adjustment device
31 Housing
32 Drive wheel
33 Friction disc brake
34 Load wheel
34A Chain link cavity
35 Gear mechanism
37 Drive shaft
39 Ratchet disc
41 Thread
45 Link chain
65 Helical compression spring
72 Gear wheel
$F_H$ Lifting force
F Load

What is claimed is:

1. An arrangement for aligning a raised load, the arrangement comprising:

a rigid carrier element and tension cords secured to and extending down from the carrier element;

tension cords each comprising a lower end configured to be secured at a respective load engagement point on the load;

wherein the tension cords include a first tension cord comprising a first length adjustment device extending between an upper connection point and a lower connection point;

wherein the first length adjustment device comprises a housing pivotably secured at the upper connection point and further comprises a drive shaft mounted rotatably in the housing;

wherein the first length adjustment device further comprises a drive wheel, a friction disc brake, a load wheel, and a gear mechanism arranged sequentially on the drive shaft, wherein the gear mechanism couples the drive shaft to the load wheel;

wherein the first length adjustment device further comprises a first chain sling, wherein the first chain sling is guided around the load wheel and comprises an end secured at the lower connection point;

wherein the load wheel comprises chain link cavities arranged about a circumference of the load wheel and configured to accommodate individual chain links of the first chain sling.

2. The arrangement according to claim 1, wherein, apart from the first tension cord, all other tension cords of said tension cords comprise at least one longitudinal section comprising a second chain sling.

3. The arrangement according to claim 1, wherein said tension cords include only one second tension cord in addition to the first tension cord for a total of two of said tension cords, wherein the respective load engagement points on the load to which the lower ends of the first tension cord and of the second tension cord are to be secured are arranged remote from one another, wherein the second tension cord has no length adjustment device.

4. The arrangement according to claim 1, wherein, in addition to the first tension cord, said tension cords include a second tension cord and a third tension cord for a total of three of said tension cords, wherein the respective load engagement point on the load to which the lower end of the first tension cord is to be secured is arranged remote from the respective load engagement points on the load to which the lower ends of the second tension cord and of the third tension cord are to be secured.

5. The arrangement according to claim 4, wherein the second tension cord and the third tension cord have no length adjustment device.

6. The arrangement according to claim 4, wherein one of the second tension cord and the third tension cord is provided with a second length adjustment device of the same configuration as the first length adjustment device.

7. The arrangement according to claim 1, wherein, in addition to the first tension cord, said tension cords include a second tension cord, a third tension cord, and a fourth tension cord for a total of four of said tension cords, wherein the respective load engagement points on the load to which the lower ends of the first tension cord and of the second tension cord are to be secured are arranged remote from the respective load engagement points on the load to which the lower ends of the third tension cord and of the fourth tension cord are to be secured.

8. The arrangement according to claim 7, wherein the third tension cord or the fourth tension cord is provided with a second length adjustment device of the same configuration as the first length adjustment device.

9. The arrangement according to claim 1, further comprising a round link chain guided over the drive wheel and configured to manually rotate the drive wheel.

* * * * *